(12) United States Patent
Lee (10) Patent No.: US 8,606,068 B2
(45) Date of Patent: Dec. 10, 2013

(54) CABLE HOUSING AND METHOD FOR RECEIVING OPTICAL FIBERS AND FIBERS OF A FIBER OPTIC CABLE

(75) Inventor: Scott David Lee, Terrigal (AU)

(73) Assignee: ADC GmbH, Berlin (DE)

( * ) Notice: Subject to any disclaimer, the term of this patent is extended or adjusted under 35 U.S.C. 154(b) by 285 days.

(21) Appl. No.: 12/921,970

(22) PCT Filed: Feb. 24, 2009

(86) PCT No.: PCT/EP2009/001304
§ 371 (c)(1),
(2), (4) Date: Sep. 10, 2010

(87) PCT Pub. No.: WO2009/121453
PCT Pub. Date: Oct. 8, 2009

(65) Prior Publication Data
US 2011/0019967 A1   Jan. 27, 2011

(30) Foreign Application Priority Data
Apr. 2, 2008 (AU) .................................. 2008901578

(51) Int. Cl.
*G02B 6/00* (2006.01)
(52) U.S. Cl.
USPC ........... 385/135; 385/134; 385/136; 385/137; 439/4; 439/501; 439/528
(58) Field of Classification Search
None
See application file for complete search history.

(56) References Cited

U.S. PATENT DOCUMENTS

| 5,473,724 | A | * | 12/1995 | Board et al. | 385/135 |
| 5,577,151 | A | * | 11/1996 | Hoffer | 385/135 |
| 5,668,911 | A | * | 9/1997 | Debortoli | 385/135 |
| 6,944,389 | B2 | * | 9/2005 | Giraud et al. | 385/135 |

FOREIGN PATENT DOCUMENTS

| AU | 667711 | 10/1993 |
| EP | 1 186 925 | 3/2002 |
| EP | 1 241 765 | 9/2002 |
| JP | 2003-322726 | 11/2003 |
| WO | WO 93/19392 | 9/1993 |
| WO | WO 00/33118 | 6/2008 |

* cited by examiner

*Primary Examiner* — Uyen Chau N Le
*Assistant Examiner* — Chad Smith
(74) *Attorney, Agent, or Firm* — Merchant & Gould P.C.

(57) ABSTRACT

The invention relates to a cable housing (1) for receiving optical fibers and fibers (28b) of a fiber optic cable (28a), comprising at least one locking element (15a, 15b) and at least one passage (16a, 16b) for the fibers (28b), wherein the locking element (15a, 15b) can be moved into at least one open and one closed state, wherein the fibers (28b) are held in the passage (16a, 16b) in the closed state, and a method for receiving optical fibers and fibers (28b) of a fiber optic cable (28a) in a cable housing (1), comprising the following process steps: a) disposing the locking element or elements (15a, 15b) in the open state; b) winding the fibers (28b) about the passage (16a, 16b); and c) disposing the locking element or elements (15a, 15b) in the closed state.

19 Claims, 6 Drawing Sheets

CABLE HOUSING AND METHOD FOR RECEIVING OPTICAL FIBERS AND FIBERS OF A FIBER OPTIC CABLE

This application is a National Stage Application of PCT/EP2009/001304, filed 24 Feb. 2009, which claims benefit of Serial No. 2008901578, filed 2 Apr. 2008 in Australia and which applications are incorporated herein by reference. To the extent appropriate, a claim of priority is made to each of the above disclosed applications.

BACKGROUND

The present invention relates to a cable housing and to a method for holding optical fibers or fibers of an optical fiber cable.

The process of binding together two ends of optical fibers is known as splicing, resulting in a "splice" being created between the two fibers. Splices are particularly susceptible to damage from shock, stress, dynamic loading and the like. Modern optical fiber networks can contain cables comprising hundreds of optical fibers and a correspondingly large number of individual splices each of which needs to be protected against the aforementioned mechanical disturbances.

Housings such as splice trays, for the containment of optical fibers and cables, particularly in the vicinity of splices, for their protection against undesirable mechanical disturbances, are known. However, handling difficulties arise during the placement of new cables into such housings with cables already placed therein. Further, devices used to retain cables within the housings tend to be obtrusive when placing cables onto the tray.

SUMMARY

The invention is based on the technical problem of providing a cable housing and a method for holding optical fibers or fibers of an optical fiber cable, by means of which the handling of optical fibers and fibers is improved.

For this purpose, the cable housing for holding optical fibers and fibers of an optical fiber cable has at least one latch and at least one passageway for the fibers, wherein the latch can be moved at least to an open condition and a closed condition, or position, wherein the fibers are held in the passageway in the closed condition. The change from the open condition to the closed condition preferably takes place in this case by movement of the latch transversely with respect to the passageway. In the open condition, the passageway represents an open channel, and in the closed condition it represents a closed channel, thus preventing undesirable movements of the fibers (for example upward). In order to accommodate new fibers, the latch is then moved to the open condition, the fibers are inserted, the latch is then moved back again to the closed condition. It should be noted that the wording "a least one latch" is also intended to cover just one latch, although the cable housing preferably has two latches.

In one preferred embodiment, the cable housing has a mount which is arranged on a base of the cable housing, wherein the latch is attached to the mount, and wherein the latch can be moved by means of a sliding movement along the mount transversely with respect to the passageway.

In a further preferred embodiment, the latch has a cover plate which, in the closed state, closes the passageway at the top.

In a further preferred embodiment, the latch has a connector for connection to the mount.

In a further preferred embodiment, the connector has grooves in the longitudinal direction and the mount has protrusions in the longitudinal direction, which allows the latch to be held detachably in intermediate positions between the open state and the closed state. In this case, it should be noted that the individual groove does not extend in the longitudinal direction, but that the grooves are arranged distributed in the longitudinal direction. Furthermore, it should be noted that, conversely, the connector may also have the protrusions, and the latch may have the grooves.

In one preferred embodiment, the passageway is bounded by a wall structure which projects from a base of the housing, wherein the wall structure comprises an inner wall and an outer wall, and wherein the inner wall is curved in order to guarantee a minimum bending radius for the fibers.

In a further preferred embodiment, the latch has a flange, which strikes against the inner wall in the closed state. The cable housing is preferably in the form of a splice cassette.

BRIEF DESCRIPTION OF THE DRAWINGS

The invention will be explained in more detail in the following text with reference to one preferred exemplary embodiment. In the figures.

DETAILED DESCRIPTION

A cable housing 1 is shown in FIGS. 1 to 4 as including a substantially flat base 2 which defines a work area 3, extending between side regions 4a, 4b and ends 5a, 5b, adapted to retain cable thereon.

The housing 1 is provided with a number of anchoring sites 7 disposed at cable entry/exit regions 8, which may be used with cable ties (not shown), or similar, to secure cables entering and exiting the housing.

The housing 1 is further provided with integrally formed side rails 9a, 9b extending along side regions 4a, 4b of the work area 3. The rails 9a, 9b span substantially the length of, and are disposed along the edge of, the work area 3. Opposite ends sections 10 of each rail 9a, 9b converge inwardly and merge into the anchoring sites 7. The side rails 9a, 9b are provided with notches 11 adapted to mate with clips of an adjacent housing (not shown), enabling adjacent housings to be stacked and secured relative to each other. The side rails 9a, 9b of the housing 1 are provided with clips 12 (cf. FIG. 2), at an underside 13 (cf. FIG. 4), to engage in associated notches 11 of an adjacent housing.

The side rails 9a, 9b are also provided with protruding lips 14 extending inwardly over the work area 3 of the housing 1. The protruding lips 14 assist in capturing optical fibers, for example, which may be looped around the work area 3, to the housing 1.

To further assist in securing the cable in place, the housing 1 is provided with latches 15a, 15b which are arranged to close off passageways 16a, 16b (cf. FIG. 6), through which the fibers 28b pass. As particularly shown in FIG. 5, each latch 15a, 15b is formed of an arcuate cover plate 17, arranged substantially parallel to the work area 3 of the base 2, and an elongate connector 18 which is arranged to interfit with a mount 19 projecting upwardly from the base 2 of the housing 1. The connector 18 and mount 19 have a series of interfitting grooves 20 and protrusions 21 that allow the latch 15a, 15b to be releasably held at different positions along the length of the mount 19.

Figure 1:
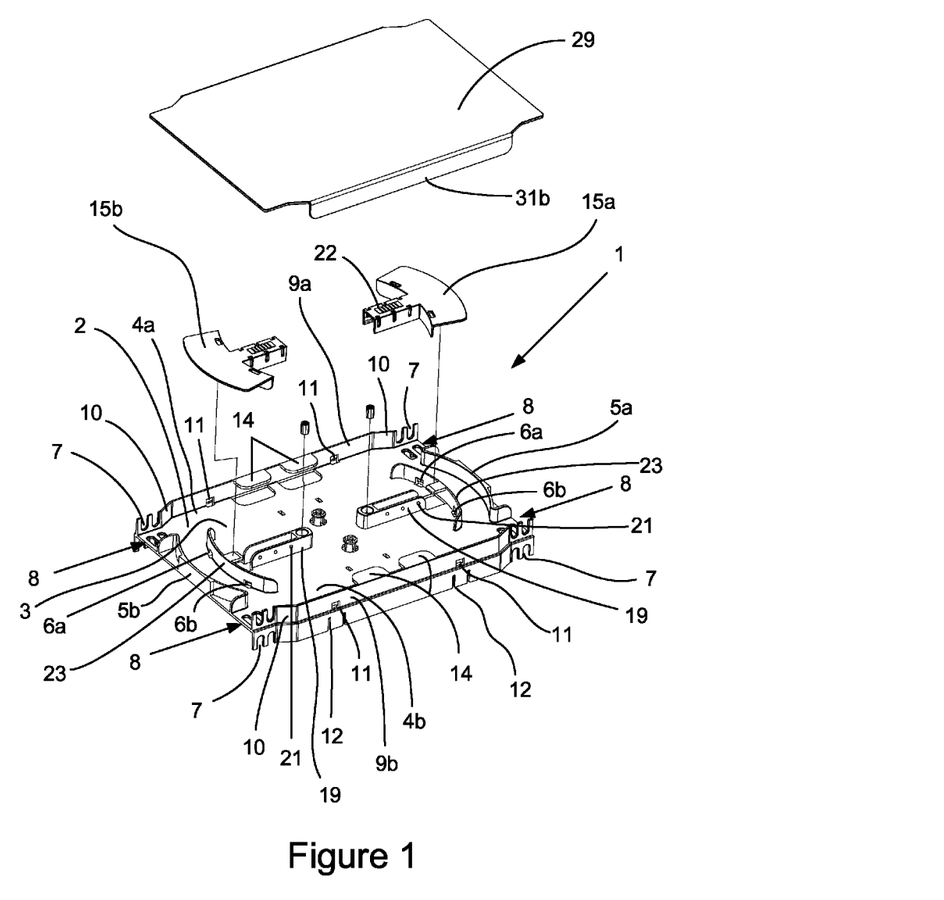
FIG. 1 is a an exploded view of a cable housing.
Figure 2:
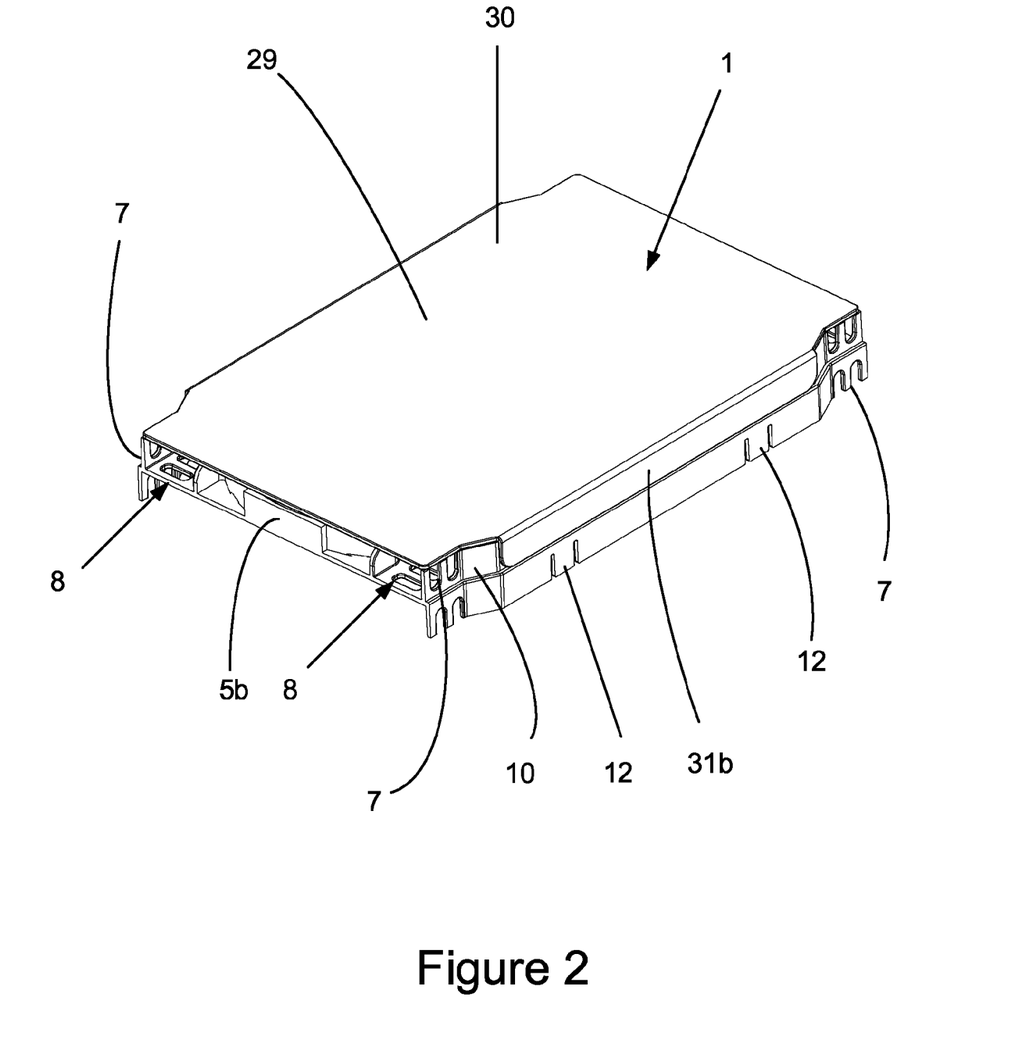
FIG. 2 is a perspective view of the housing shown in FIG. 1.
Figure 3:
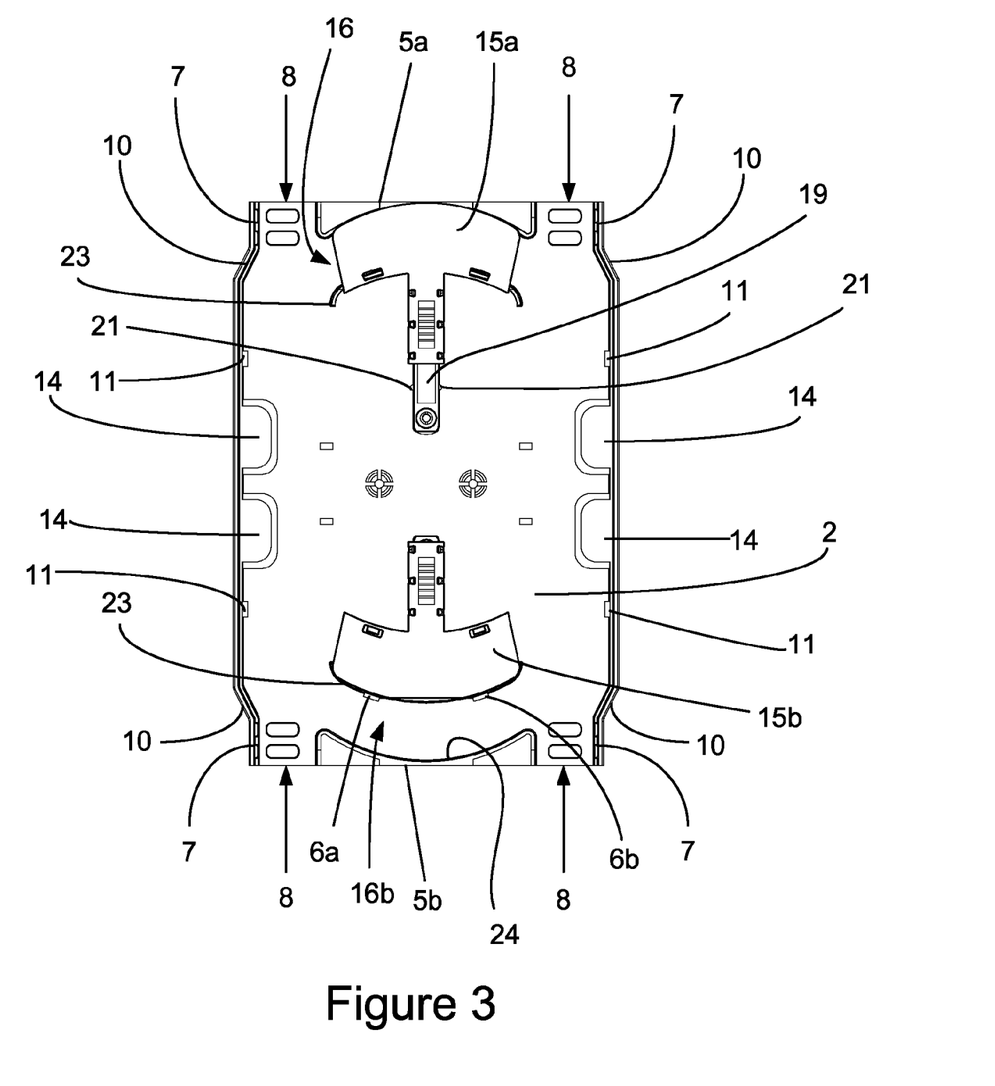
FIG. 3 is a top view of the housing shown in FIG. 1.
Figure 4:
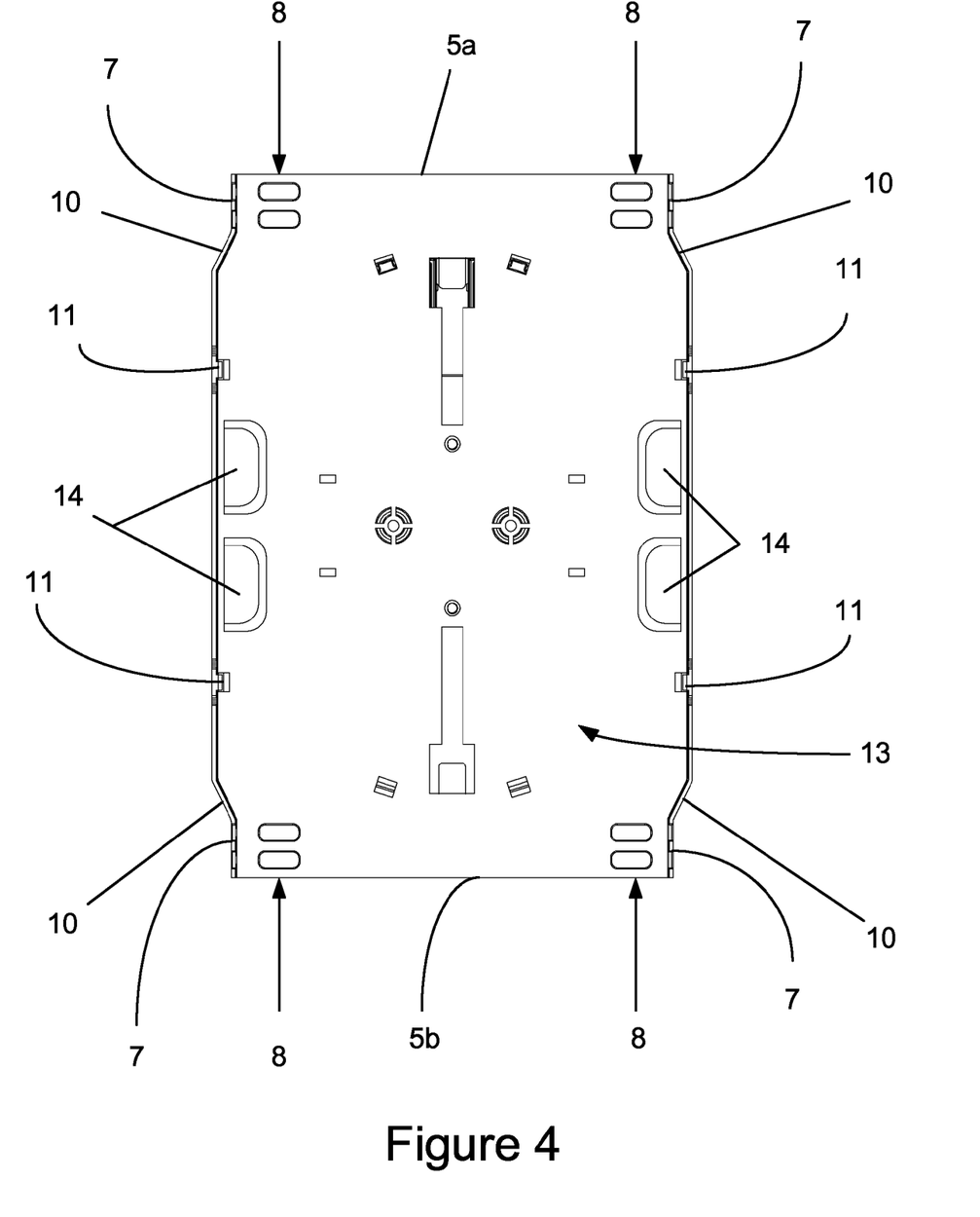
FIG. 4 is a bottom view of the housing shown in FIG. 2.
Figure 5:
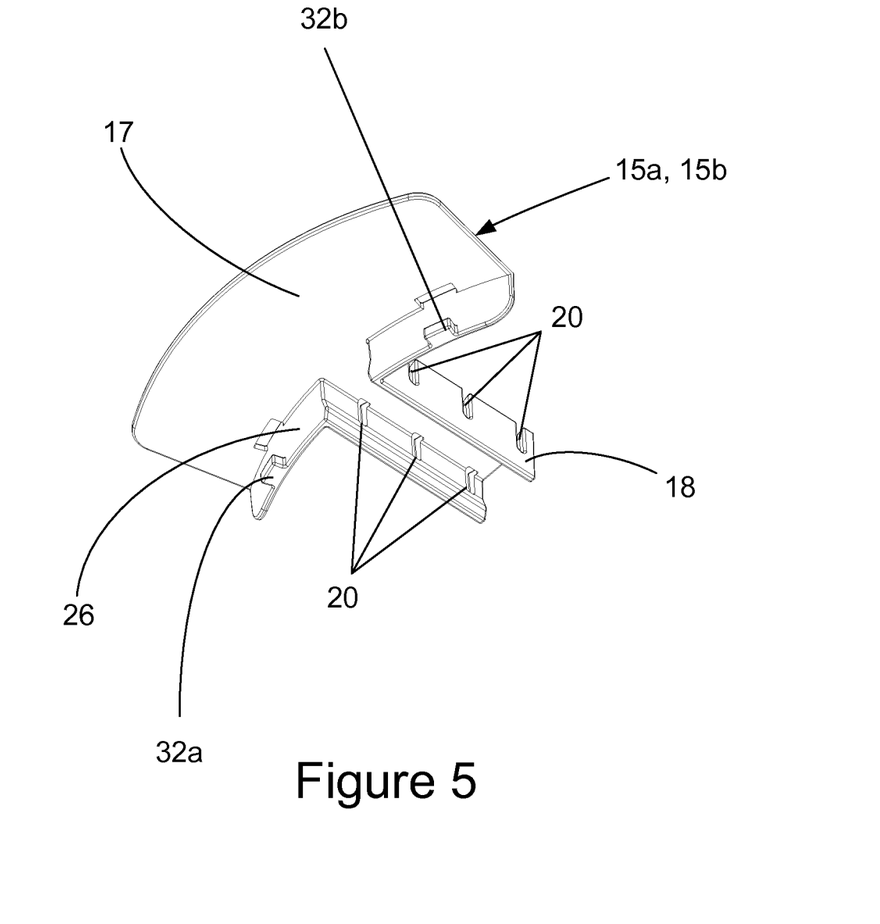
FIG. 5 is a perspective view of a latch of the housing shown in FIG. 1.

A grip pad 22 is provided on the latch 15a, 15b to facilitate sliding movement of the connector 18 with respect to the mount 19 between the different positions. Alternatively, the latch 15a, 15b could be lifted clear of the mount 19 and then moved to a new position and reconnected with the mount 19.

Figure 6:
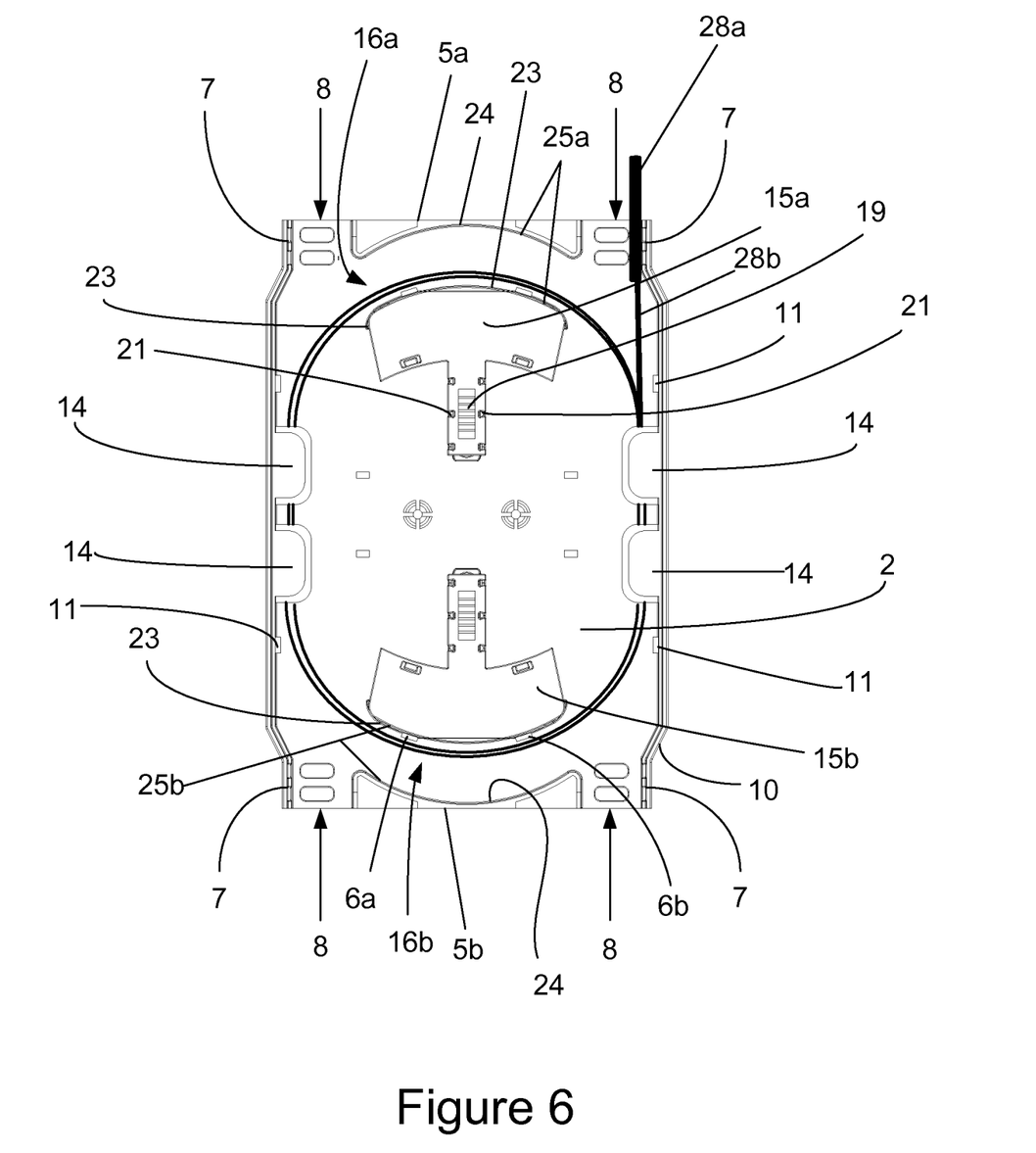
FIG. 6 is a further top view of the housing shown in FIG. 1.

In the arrangement shown in FIG. 6, a cable 28a is fastened to the anchoring site 7 by way of a cable tie (not shown), for example. The latches 15a, 15b are in an open condition, which allows fibers 28b of the cable 28a to be looped around the curved inner walls 23 and under the lips 14. The lips 14 prevent the fibers 28b from lifting away from the base 2 and spilling over the side rails 9a, 9b.

The fibers 28b are freely looped into the passageways 16a, 16b. Each passageway 16a, 16b is defined by wall structure 25a, 25b which projects from the base 2 of the housing 1 and which includes an inner wall 23, defining a minimum bend radius for fibers 28b passing through the passageway 16a, 16b, and outer wall 24. The outer wall 24 is located adjacent an end 5a, 5b of the housing 1, while the inner wall 23 is positioned closer to a centre of the housing 1. As can be seen in FIG. 6, the latches 15a, 15b have a relatively low profile relative to the base 2 and, additionally, are positioned inwardly of the wall structure 25a, 25b and away from a periphery of the housing 1, which thereby allows the fibers 28b to be freely looped into the passageways 16a, 16b without obstruction.

Once the fibers 28b have been arranged in the described manner, the ends of the individual fibers 28a are joined together using optical fiber splicers (not shown).

With the fibers 28b seated in the passageway 16a, for example, the latch 15a can be moved to close the passageway 16 by sliding the latch 15a along the mount 19 transversely to the passageway 16a and parallel to the base 2 so that the cover plate 17 covers the passageway 16a to thereby secure the fibers 28b to the housing 1. The result is the arrangement shown in FIG. 3. The cover plate 17 is also provided with a flange 26 which abuts the inner wall 23 when the latch 15a is in the fully closed condition, in order to restrict further sliding movement of the latch 15a. The flange 26 includes protrusions 32a, 32b (cf. FIG. 5) arranged for resilient engagement with corresponding notches 6a, 6b of the inner wall 23 to resiliently secure the latch 15a to the inner wall 23.

The latch 15b is essentially a mirror image of the latch 15a and like reference numerals are used to denote like parts. As can be seen, the latch 15b is shown in the open condition with the leading edge of the cover plate 17 abutting the inner wall 23 of the base 2 so that the passageway 16b is open to receive fibers 28b.

The fibers from a second cable (not shown) are looped around the curved walls 23 in an opposite direction to that of the fibers 28b of the first cable 28a so that the fibers would present themselves to the splices at opposite ends of the cable housing 1.

As may be appreciated from above, one particular advantage conveyed by the embodiments of the invention herein described, is that the latch 15a, 15b is slidably moveable between open, closed and semi-retracted conditions. The slidable movement removes the latch 15a, 15b from above the passageway 16a, 16b, without it becoming an obstruction during the process of looping fibers 28b on or off the housing 1. Furthermore, the semi-retracted condition provides partial restraint for cable 28a and the fibers 28b already within the passageway 16a, 16b, whilst enabling access for the addition of more cables 28a and fibers 28b thereto.

Another advantage is provided by the inner walls 23. Due to the fragility of some cables 28a and fibers 28b, it is desirable that there be protection for cables 28a and fibers 28b against bending below its minimum design bend radius. The inner wall 23, having a radius of curvature at least as large as the minimum bend radius of a cable or fiber placed thereagainst, should provide some protection for cable or fiber being secured to the housing.

The cable housing 1 also includes an outer cover plate 29 (cf. FIG. 1) shaped to fit over the work area 3 of the body 2 to capture and protect the above-described components within the housing 1. The outer cover plate 29 includes a planar body section 30 (cf. FIG. 2) of corresponding dimensions to that of the work area 3. The outer cover plate 29 includes opposed rails 31 that extend outwardly from the body section 30 in common directions, along respective sides of the plate 29. The rails 31 are shaped to fit over respective rails 9a, 9b when the cover plate 29 is coupled to the cable housing 1. The plate 29 includes protrusions (not shown) arranged for resilient engagement with corresponding notches 11 of the rails 9a, 9b to resiliently secure the cover plate 29 to the cable housing 1.

The embodiments have been described by way of example only and modifications are possible within the scope of the invention.

Throughout this specification and claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavor to which this specification relates.

LIST OF REFERENCES 1. cable housing
2. base
3. work area
4a. side region
4b. side region
5a. end
5b. end
6a. notch
6b. notch
7. anchoring sites
8. cable entry/exit regions
9a. side rail
9b. side rail
10. end sections
11. notches
12. clips
13. underside
14. lips
15a. latch
15b. latch
16a. passageway
16b. passageway
17. cover plate
18. connector
19. mount 20. grooves
21. protrusions
22. ribbing
23. inner wall
24. outer wall
25a. wall structure
25b. wall structure
26. flange
28a. cable
28b. fibers
29. outer cover plate
30. body section
31. side rails
32a. protrusion
32b. protrusion

The invention claimed is:

1. A cable housing device for holding optical fibers or fibers of an optical fiber cable, comprising:
   a cable housing including at least one latch and at least one passageway for the fibers, wherein the latch can be moved at least to an open and a closed state, wherein the fibers are held in the passageway in the closed state; and
   a removable top cover plate arranged to be coupled to the cable housing;
   wherein the cable housing has a mount which is arranged on a base of the cable housing, wherein the latch is attached to the mount and configured to slide along the mount relative to the base, wherein the latch can be moved by sliding the latch along the mount transversely with respect to the passageway, and wherein the removable top cover plate encloses the latch and the mount within the cable housing such that the removable top cover plate extends above the base in a longitudinal direction.

2. The cable housing device as claimed in claim 1, wherein the latch has a cover plate, which closes the passageway at the top in the closed state.

3. The cable housing device as claimed in claim 1, wherein the latch has a connector for connection to the mount.

4. The cable housing device as claimed in claim 3, wherein the connector has discrete grooves in the longitudinal direction and the mount has protrusions in the longitudinal direction, which allows the latch to be held detachably in intermediate positions between the open and the closed state.

5. The cable housing device as claimed in claim 1, wherein the passageway is bounded by a wall structure which projects from a base of the housing, wherein the wall structure comprises an inner wall and an outer wall, wherein the inner wall is curved in order to guarantee a minimum bending radius of the fibers.

6. The cable housing device as claimed in claim 5, wherein the wall structure is arranged on one end of the cable housing.

7. The cable housing device as claimed in claim 5, wherein the latch has a flange which strikes against the inner wall in the closed state.

8. The cable housing device as claimed in claim 1, wherein the cable housing is in the form of a splice cassette.

9. A method for holding optical fibers or fibers of an optical fiber cable comprising:
   (a) providing a cable housing having opposing sides extending between opposite ends, the cable housing including a base extending between the sides and ends, the cable housing also including a latch coupled to the base and moveable between open and closed conditions relative to a passageway defined along the base, the cable housing including a removable top cover plate arranged to cover the cable housing;
   (b) arranging said latch in said open condition by moving the latch parallel to the base;
   (c) winding the fibers around the passageway when the latch is in the open condition;
   (d) arranging said latch in said closed condition by moving the latch parallel to the base to retain the fibers in the passageway; and
   (e) coupling the removable top cover plate to the sides of the cable housing to enclose the latch within the cable housing, wherein the removable top cover plate extends above the base in a longitudinal direction.

10. The method of claim 9, wherein moving the latch comprises sliding the latch.

11. The method of claim 9, wherein arranging the latch in the open condition comprises moving the latch away from a nearest one of the ends of the housing; and wherein arranging the latch in the closed condition comprises moving the latch towards the nearest one of the ends of the housing.

12. A cable housing device for holding optical fibers or fibers of an optical fiber cable, comprising:
   a generally planar base having side walls and end walls, the base defining a passageway;
   a removable top cover plate arranged to be coupled to the cable housing device;
   a first curved inner wall extending upwardly from the base, the first inner wall cooperating with a first of the end walls to define a securable region of the passageway; and
   at least one slideable latch coupled to the base that slides parallel to the base, the slideable latch having a cover plate that extends towards the first end wall, the slideable latch being configured to move between at least a first position and a second position, wherein the cover plate extends between the first inner wall and the first end wall to cover the securable region of the passageway when the slideable latch is in the first position, and wherein the cover plate provides access to the securable region of the passageway when the slideable latch is in the second position, and wherein the removable top cover plate encloses the slideable latch within the cable housing such that the removable top cover plate extends above the base in a longitudinal direction.

13. The cable housing device as claimed in claim 12, wherein the slideable latch has a flange that strikes against the first inner wall when the slideable latch is in the first position.

14. The cable housing device as claimed in claim 12, wherein the slideable latch is slideably coupled to a mount that is fixedly coupled to the base.

15. The cable housing device as claimed in claim 14, wherein the at least one slideable latch is configured to be held detachably in intermediate positions between the first and the second position.

16. The cable housing device as claimed in claim 14, wherein the cable housing device forms a splice cassette.

17. The cable housing device as claimed in claim 14, further comprising:
   a second curved inner wall extending upwardly from the base, the second inner wall cooperating with a second of the end walls to define a second securable region of the passageway; and
   at least a second slideable latch coupled to the base between the slideable latch and the second curved inner wall, the second slideable latch having a second cover plate that extends towards the second end wall, the second slideable latch being configured to move between at least a first position and a second position, wherein the second cover plate extends between the second inner wall and the second end wall to cover the second securable region of the passageway when the second slideable latch is in the first position, and wherein the second cover plate provides access to the second securable region of the passageway when the second slideable latch is in the second position.

18. A cable housing device for holding optical fibers or fibers of an optical fiber cable, comprising:

a generally planar base having side walls and end walls, the base defining a passageway;

a first curved inner wall extending upwardly from the base, the first inner wall cooperating with a first of the end walls to define a securable region of the passageway;

at least one slideable latch coupled to the base, the slideable latch having a cover plate that extends towards the first end wall, the slideable latch being configured to move between at least a first position and a second position, wherein the cover plate extends between the first inner wall and the first end wall to cover the securable region of the passageway when the slideable latch is in the first position, wherein the cover plate provides access to the securable region of the passageway when the slideable latch is in the second position, and wherein the slideable latch is slideably coupled to a mount that is fixedly coupled to the base;

a second curved inner wall extending upwardly from the base, the second inner wall cooperating with a second of the end walls to define a second securable region of the passageway; and at least a second slideable latch coupled to the base between the slideable latch and the second curved inner wall, the second slideable latch having a second cover plate that extends towards the second end wall, the second slideable latch being configured to move between at least a first position and a second position, wherein the second cover plate extends between the second inner wall and the second end wall to cover the second securable region of the passageway when the second slideable latch is in the first position, and wherein the second cover plate provides access to the second securable region of the passageway when the second slideable latch is in the second position.

19. The cable housing device as claimed in claim 1, wherein the latch has a t-shape.

* * * * *